(12) United States Patent
Pierson, Jr.

(10) Patent No.: US 6,683,869 B1
(45) Date of Patent: Jan. 27, 2004

(54) METHOD AND SYSTEM FOR IMPLEMENTING AN IMPROVED DS0 SWITCHING CAPABILITY IN A DATA SWITCH

(75) Inventor: Forrest L. Pierson, Jr., Dallas, TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/452,956

(22) Filed: Dec. 2, 1999

(51) Int. Cl.7 .......................... H04L 12/66; H04L 12/28
(52) U.S. Cl. ...................... 370/352; 370/351; 370/353; 370/354; 370/355; 370/356; 370/389; 370/392
(58) Field of Search ................................ 370/351–356, 370/389, 392

(56) References Cited

U.S. PATENT DOCUMENTS

| | | | | | |
|---|---|---|---|---|---|
| 5,377,189 A | * | 12/1994 | Clark | .......................... | 370/462 |
| 5,719,858 A | * | 2/1998 | Moore | .......................... | 370/347 |
| 6,249,527 B1 | * | 6/2001 | Verthein et al. | ............ | 370/466 |

* cited by examiner

*Primary Examiner*—Dang Ton
*Assistant Examiner*—Ron Abelson (57) ABSTRACT

A system and method for moving voice telephone calls through a data network. More particularly, the system and method are directed to the efficient operation of a novel port card for installation in present and future versions of data switches. Together port cards and data switches form nodes. The port card receives and transmits out signals through respective ports connected to links between nodes. The method provides for voice data to be switched in a Ds0 switching matrix, which is resident on the port card.

44 Claims, 4 Drawing Sheets

METHOD AND SYSTEM FOR IMPLEMENTING AN IMPROVED DS0 SWITCHING CAPABILITY IN A DATA SWITCH

I. BACKGROUND OF THE INVENTION a. Field of the Invention

The present invention relates generally to passing voice communications over a data communications network such as an asynchronous communications network or a synchronous communications network.

b. Background Information

Almost all customers of data traffic today have additional, separate links to carry voice. This is inefficient for the customer and the communications provider. Many are seeking techniques that place Ds0 channels in data packets for transmission over a data link, so that they can remove their voice links.

A communications network serves to transport information among a number of locations. The information is usually presented to the network in the form of time-domain electrical signals and can represent any combination of voice, video, or computer data. A typical communications network consists of various physical sites called "nodes," interconnected by conduits called "links." Each link carries information from one site to another site. End user sites may contain data terminating equipment (DTE) for combining, separating, and transforming data with or without voice. Network provider sites usually include either edge switches, with user network interfaces (UNI), or backbone switches, which only connect to other backbone switches and edge switches and do not contain UNI.

Voice information is carried via a Ds0 (or voice) channel that is a 64 kilobits per second (64 Kbps) channel and also the worldwide standard for digitizing voice conversation. The channel throughput is 64 Kbps because a digital data stream can adequately represent an analog voice signal if sampled at a rate of 8000 samples per second. If each voice sample is digitized using 8 bits, this results in a digital data stream of 64 Kbps. Since Ds0 is a synchronous TDM link, once a channel connection has been setup between two users, that channel is dedicated until the connection is torn (or brought) down, and cannot be used by anything or anybody else even if there is silence in the line.

Data currently is transmitted between nodes either as synchronous or asynchronous. In a synchronous network using Synchronous Transfer Mode (STM), each timeslot is assigned a certain time when it is to arrive at each node. The time when the timeslot arrives determines where the timeslot goes. Thus, the individual timeslots do not need to have routing information within them.

Asynchronous Transfer Mode (ATM), Frame Relay (FR), and Internet Protocol (IP), collectively called data, are considered asynchronous because each node in the network does not know until after a data packet arrives where it is intended to go. The arrival of a particular data packet at a node, on the other hand, is not guaranteed to occur at a particular point in time. Only by analyzing the routing information in the header can the data switch know where to route the data packet.

Asynchronous Transfer Mode is designed to be carried over the emerging fiber optical network, called the Synchronous Optical NETwork (SONET), although it can be carried over almost any communications link. The basic unit of ATM is a data packet called the ATM cell. Each cell contains two parts, a header, which contains routing information, and a payload, which contains the data to be transported from one end node to another. The ATM cell is always the same size.

Frame Relay and Internet Protocol are two other asynchronous types of communications protocols. Each is similar to ATM in that they also consist of a data packet. However, they differ from ATM in that their packet size can vary from packet to packet, and both can be considerably larger than ATM. This allows them to make more efficient use of the bandwidth of the communications media they travel over, but it makes receiving them more difficult in that packet size must be calculated for each packet. Both the FR protocol and IP may be used in point to point connections, but IP may also be used when multiple ports are connected to a single transmission medium.

Data can consume as much or as little as is needed for carrying actual traffic, because data does not reserve a fixed amount of bandwidth per link. While voice will never overload, or oversubscribe, the capacity of its links, there are mechanisms in place to handle data overloads when more is available than a physical link can carry. It is these mechanisms that allow data network designers to specify more data demand than capacity to carry, which is a process called statistical multiplexing.

Statistical multiplexing is the concept of giving multiple customers, in sum total, more bandwidth through a physical connection than it can carry. This is also known as over-subscribing. Studies have shown that customers will not always use all of the bandwidth their carrier has set aside for them. It is during this period of non-use by a customer that spare bandwidth is available for the over-subscription. If sufficient numbers of customers are placed on a single physical connection then large quantities of spare bandwidth can be realized.

When traffic is isolated among two or more physical connections, less statistical multiplexing can occur, as customers on one connection cannot use spare bandwidth on another. By joining all customers into a single, large connection, better statistical multiplexing occurs and the carrier is able to sell more bandwidth on one high-speed physical connection than on several smaller connections whose sum is equal to the one high-speed connection.

There are different ways of handling overloads in the data network. In ATM, the network is designed with large buffers which absorb the excess traffic, queueing it up until capacity is available to place the traffic through the network. The traffic that is delivered out of its buffers first is determined by the quality of service (QOS) the customer has paid the carrier to provide. Higher QOS traffic is removed from its buffers before lower QOS. This is important for real time applications such as voice or interactive TV services, which must get through the network with a minimum amount of delay.

In those instances where so much excess traffic is delivered that the network cannot queue it up in buffers, the lower QOS traffic is deleted, or dropped, from the buffers to make room for higher QOS traffic to be queued up. Ideally, customer end-to-end protocols will detect this loss of traffic and will re-transmit the lost information.

An emerging standard in the IP network uses a different approach to handling overloads. In IP, there is no QOS as in ATM. Once a data packet is injected into the IP network, it will be given equal priority with all other traffic and delivered to its destination with a minimum of delay.

In an IP network, the traffic density in a link is closely monitored. As it begins to approach the link capacity, the IP data switch send congestion notices back towards the data sources telling them to slow down the amount of data they send. Each notice will, for a limited length of time, force the data source to restrict what it sends out. As link traffic gets closer and closer to link capacity, more of these messages are sent backwards. When an IP switch receives congestion notices and reduces the rate of transmission, it may experience congestion as well and will send congestion notices back to its sources.

Eventually, the notices reach the traffic origins, customers. The customer equipment must then cut back on what is sent into the network, and must decide which traffic it puts out has the highest priority so that it goes out while the lower priority traffic has to wait. Thus, the IP network passes the job of determining traffic priority to the customer. If a customer has a great deal of high priority traffic, it may pay a premium to not receive as many congestion notices when congestion hits the network as another customer may pay, so that it will get more guaranteed traffic during congestion.

The IP data switches also usually maintain small buffers, but these are designed exclusively to handle the small, temporary overloads that occur until the congestion notices are responded to and reduced traffic flows into the switch.

These two different means of determining traffic priority are given as an example only. Whatever the mechanism, voice will usually be given a higher priority than data. By ensuring that the voice traffic does not physically exceed the capacity of the network links, the network systems engineering team can ensure all voice gets through, squeezing out the needs of data traffic. This allows the physical links to stay at or close to capacity even as the demands of Ds0 change. This spreads the cost of the links out over more traffic, reducing the cost per data packet and thus making the network more efficient than dedicated links carrying voice can be.

Each of ATM, FR, and IP has certain benefits and certain disadvantages. By utilizing these protocols in areas where their benefits can be utilized to the maximum efficiency while minimizing the losses incurred from their disadvantages, a more efficient network is realized.

Because of its fixed size packet, ATM is more attractive on the higher speed links where it is considerably less expensive to design hardware to receive a fixed size packet than a variable sized packet. On the lower speed, but higher per-bit cost links, FR and IP are more attractive because of their line utilization efficiency. And at these speeds the cost difference between a port that can receive variable sized packets versus one that only has to receive fixed size packets is usually more than offset by the fact that there are no segmentation and reassembly functions that have to be performed. Segmentation and reassembly is needed when a variable sized message is placed in multiple data packets, which is necessary with ATM.

Improvements in the state of the art of design technology are making the segmentation and reassembly functions less expensive. On the other hands, similar improvements are making it easier to design IP and FR receivers that can operate at SONET rates. What will likely happen is that the industry will see ATM, which is maturer than IP, dominate the high-speed market for the next 5 to 10 years. After that time period, IP, which has a simpler and less expensive congestion management scheme than ATM, will become the dominant mechanism in high-speed traffic.

On a bit per bit basis, it is significantly less expensive to transmit data over fiber than using metallic links by several factors of ten. The theoretical capacity of fiber is in excess of 20 tera bits per second (20 million million bits per second). Current standards at 10 thousand million bits per second (gigabits per second, or gbps), and will soon increase to 40 thousand million bits per second. Furthermore, technology is also improving on the ability of a single fiber to carry numerous wavelengths, or colors. Each wavelength can carry 10 gbps independently of what the other wavelengths in the fiber are doing.

On the other hand, metallic links that can span long distances and are reasonable to manufacture have long ago reached their theoretical limits of roughly under 500 million bits per second. They are much bulkier than fiber optic links. The metallic link is also susceptible to rust and corrosion, whereas the fiber is relatively chemically inert.

A T1 link, which is an example of a metallic link, transmits one T1 frame 8000 times per second (or one frame every 125 $\mu$s). Each T1 frame contains a T1 payload with 24 Ds0 timeslots, one for each Ds0 channel with 8 bits in each timeslot. Each T1 frame also has a T1 frame bit that identifies the start of the T1 frame, so that a T1 frame has a total size of 193 bits. This results in a data stream of 1.544 Mbps (8000 frames/sec·193 bits/frame).

Repeaters, which re-amplify the signal, are needed to prevent signal attenuation (loss of signal strength as a signal travels down a link) on either type of link. Metallic links attenuate the signals more than do fiber links, so more repeaters for metallic links are needed than for fiber links for a given distance. For instance, a T1 link can span a maximum of just over one mile (6000 feet) before a repeater is needed; for T3, the range is under 1400 feet. It is not unusual for fiber optic links to span 50 to 100 miles between repeaters. Fiber also costs less per foot physically than metallic links do, and the connectors at each end of a fiber link are similar in price to the connectors of a metallic link. Given the longer span between repeaters, this translates into fewer connectors, and hence lower costs, for fiber.

While metallic interfaces on port cards and repeaters are less expensive than fiber interfaces, the cost difference does not justify the reduced number of repeaters in a fiber network, nor does it justify the more expensive cabling needs even inside a switching facility. Further, the limited range of T3 metallic links has impacted the designs of several switching facilities, whereas the range of fiber links does not factor into their design.

c. Related Art

A data switch routes data packets from incoming ports to outgoing ports through a data switching matrix. There are numerous designs, of which only two will be discussed here.

One data switching matrix is a dedicated matrix that receives data packets from every incoming port card (or port interface), buffers them, and then routes them to their intended outgoing data port. Because multiple incoming packets may be destined for each outgoing data port, the links to the outgoing ports contain buffers in them that allow the data packets to accumulate until they can be delivered to the outgoing port card.

Another design uses a high-speed backplane as the delivery mechanism and circuits on each port card to examine, then accept or reject each packet. This scheme is easier to implement, but requires advanced technology to deliver high data volumes from all incoming ports to all outgoing ports. Such technologies, including low voltage differential swing (LVDS), have recently become available.

These are but a basic example of a data switching matrix designs. There are many variations on these basic concepts. These are given here as an example of how data switching can work.

Regardless of the method used, the data switching matrix can deliver a data packet from any source to any destination. Nor is the data packet limited to a single destination. Sending a data packet to multiple destinations is called multi-casting or broadcasting. Applications that might use this feature would be updates of database copies to allow local access to the database in different, distant areas, the transmission of entertainment services to multiple destinations, etc.

In order for a data switching network to route Ds0 traffic, the Ds0 channels inside the data packets must be removed and re-routed. As data switches are not designed to be synchronous Ds0 switches, a Ds0 switching matrix must be placed somewhere within the data switch to perform this function. The Ds0 switching matrix must take in data packets containing Ds0 channels, remove the Ds0 channels from the packets, switch the channels around, repackage the Ds0 channels into data packets, and place the data packets back into the data switch.

Ds0 switching nodes (Ds0 switches) contain a switching matrix that is used to route Ds0 samples from any timeslot of any incoming link to any timeslot on any outgoing link. An example of such a switching matrix is a single stage Time Slot Interchange (TSI) matrix. A TSI matrix places all incoming Ds0 samples from all incoming links into pre-defined locations in a randomly accessible memory (RAM). This RAM is frequently referred to as the data RAM. Many designs also place in parallel with the Ds0 channel internal status concerning the Ds0 channel in the same location in the data RAM.

A second RAM, called a control RAM, contains connection information and is used to provide a lookup address into the data RAM. Each location in the control RAM represents what an outgoing timeslot on a particular outgoing link will carry. Each location in the control RAM will address a location in the data RAM, and thus connect a particular incoming timeslot of an incoming link with an outgoing timeslot of an outgoing link. The control RAM may also possess additional control bits associated with the outgoing timeslot.

The contents of the control RAM are read out in a predetermined pattern. By following this pattern, internal timing designs within the node will assure that the intended incoming timeslot represented in the data RAM is presented to the intended outgoing timeslot.

The most efficient design for a TSI switching matrix is achieved when all Ds0 channels can be physically stored in a single RAM. If the number of Ds0 channels exceeds the limits of a single RAM, then the amount of RAM needed is the square of the number of RAM needed to store all the Ds0 channels once. This is because the job of selecting outgoing channels has to be split up among two or more identical circuits. Each outgoing circuit needs its own dedicated copy of each incoming channel in order to function without any possibility of contention occurring between it and another outgoing circuit for the same data RAM.

Today's state of the art can write or read (access) a RAM approximately 16,384 times (16K; "K" denotes 1024, or $2^{10}$) in a 125 $\mu$s time period. If there are 32K Ds0 channels, then four memories are needed. Two RAMs are needed to store all 32K channels, splitting them among the two RAMs. This number must then double because there will be two outgoing circuits and each needs all 32K incoming channels available to it; therefore each incoming channel has to be duplicated into two sets of RAMs. If there were 48K channels there would have to be nine sets of RAMs, and if there were 68K channels there would have to be 16 sets of RAMs.

This is but a basic example of a Ds0 switching matrix design. There are many variations on this basic concept. It is given here as an example of how Ds0 switching works.

However, most data switches do not include a Ds0 switch. For this reason, the data switch will have one or more of its port interfaces removed and replaced with a Ds0 switch with a Ds0 switching matrix designed to appear as a port interface to the data switch.

Existing designs are inefficient in a number of areas. In one area, any Ds0 channel that has to be extracted from a data packet passes through the data switching matrix twice. This is because the Ds0 switching matrix is designed as an afterthought, and takes on the appearance of another port card in the data switch. Thus, the first time the Ds0 channel passes through the data switching matrix is when it is routed to the Ds0 switching matrix. The second time occurs after the Ds0 switching matrix has extracted the Ds0 channel, switched it around, and then placed it into a new data packet and returned it to the data switching matrix to be routed to the appropriate outgoing port.

Another area existing designs are inefficient in is that in order to handle large numbers of Ds0 channels to take advantage of the statistical multiplexing of a large, integrated network, a large switching matrix on the order of 256K to 1024K Ds0 channels must exist in the switch. This large matrix must take in large amounts of data packets, break out the Ds0 channels within them, route them through the matrix, make new data packets, and send them back through the switch to the destination port. As stated earlier, current Ds0 switching technology can only access a RAM 16K times in a 125 $\mu$s time period. Because of the squaring problem discussed earlier, a 256K Ds0 channel matrix would take 256 data RAMs to provide for a TSI switching matrix to handle all connections.

Presently, there are two primary architectures for placing a Ds0 switch in a data switch. One concept places the Ds0 switch inside the data switch such that it does not occupy the physical space of an external port, but it consumes resources from the data switching matrix as if it were an external port card. As a result, the Ds0 switch still consumes a port interface that reduces the number of external ports the matrix can otherwise support.

A data switch cannot switch individual Ds0 channels within a data packet unless a Ds0 switch with a Ds0 switching matrix is added to the data switch. Many designs call for installing a large Ds0 switching matrix in the slot of a port card, or some other means of having the Ds0 switching matrix attach to the data switching matrix in a fashion similar to a port card. Such Ds0 switches consume resources and bandwidth within the data switch that reduces the number of port interfaces available to the data switch, increasing the costs per port of the remaining port interfaces on the data switch. A centrally located Ds0 switching matrix must be able to handle large quantities of Ds0 channels concurrently, which requires a great deal of bandwidth out of the data matrix, and a larger amount of memory than if the load is shared across each port card. The alternative to a large Ds0 switching capacity is to limit the Ds0 switching capacity of the data switch to a small fraction of the overall capacity of the data switch.

Another concept places the Ds0 switch on the port card sequentially between the incoming port and the connection to the data switching matrix to provide processing for information flows entering the data switch only. This concept solves the efficiency problems stated previously. However, this concept makes it impossible to combine Ds0 channels from different incoming ports into a single data packet. In data switches carrying a large amount of Ds0 traffic, this may lead to several problems. First, the likelihood of blocking, or the inability to find, a dedicated 64 kbps Ds0 path through the switch increases. Second, this inability to combine incoming Ds0 channels leads to the creation of many smaller data packets, which increases demand on the header processing circuitry of the network if the data packets are of variable size, or the creation of data packets with unused payload space if the packets are of a fixed size. Third, the inability to combine Ds0 channels may lead to latency, or the addition of more delay, between the source and the destination of a Ds0 channel. For instance, round trip delays starting around 140 ms, and definitely in excess of approximately 200 ms or more will affect the spontaneity of a conversation. With the inability to bundle all Ds0 channels together, more data switches must process the Ds0 channels through their Ds0 switching matrixes, increasing delay. Fourth, this design does not lend itself easily to combining channels together to maximize the use of switch and network resources, to testing, and increases delay of Ds0 traffic. Fifth, the design prevents reasonable path verification and bit error rate (BER) tests on the Ds0 switching matrix.

Notwithstanding the usefulness of the above-described voice switching matrices and port cards, a need still exists for placement of a Ds0 switch with a Ds0 switching matrix on a port card so that a node in a communications network will more efficiently handle voice communication. Furthermore, a Ds0 switching matrix is needed that is capable of reducing the processing load on a data switching matrix and attached port cards.

II. SUMMARY OF THE INVENTION

The present invention is directed to improving the efficiency of voice communication over a data communication network and thus gain additional efficiencies and economies of scale by providing one communications network instead of two separate communication networks for voice and data, respectively. Thus data packets may include voice channels, data, or any type of service. The invention while addressing the problems of the prior art obtains advantages that were not achievable with the prior art.

In accordance with one aspect of the invention, a Ds0 switch with a Ds0 switching matrix on each port card is connected to a data switch through in part a high speed bus thus providing switching for incoming and outgoing data packets.

In accordance with another aspect of the invention, the data switch and attached port cards are capable of switching large numbers of Ds0 channels without incurring the costs of providing for an "N squared" data RAM. When the Ds0 capacity of the switch exceeds the ability of a single data RAM to hold all Ds0 channels to be switched, only additional RAMs in proportion to the number of Ds0 channels are added, not in proportion to the square of the number of Ds0 channels.

In accordance with another aspect of the invention, a communications network includes: links, at least two nodes connected to said links, each of said nodes includes a data switch having a data switching matrix, a data bus connected to said data switch, and at least one port card connected to said data bus, said port card includes a high speed data bus, and a Ds0 switch connected to said high speed data bus, said Ds0 switch includes a Ds0 switching matrix; and wherein said Ds0 switching matrix disassembles and reassembles packets after receipt of the packet by the port card from at least one of another data switch and said data switching matrix connected to said data bus.

In accordance with another aspect of the invention, a communications network node comprising: a data switch, said data switch includes a data switching matrix, a data bus connected to said data switch, and at least two port cards connected to said data bus, each of said at least two port cards includes a high speed data bus, and a Ds0 switch connected to said high speed data bus, said Ds0 switch includes a Ds0 switching matrix; and wherein said Ds0 switching matrix disassembles and reassembles packets with Ds0 channels after receipt of the packet by the port card from at least one of a source other than said data switch and from said data switching matrix connected to said data bus based on the packet.

In accordance with another aspect of the invention, a port card comprising: a high speed data bus, an intake system connected to said high speed data bus, an outgoing system connected to said high speed data bus, a port control system connected to said high speed data bus, a switch interface connected to said high speed data bus, and a Ds0 switch connected to said high speed data bus; and wherein said Ds0 switch disassembles and reassembles packets after initial receipt of the packet by at least one of said intake system and said switch interface based on the packet.

In accordance with another aspect of the invention, a port card comprising: means for receiving packets as at least one of a asynchronous transmission and a synchronous transmission, means for transmitting packets as at least one of a asynchronous transmission and a synchronous transmission, means for interfacing with a data switch, means for processing packets having Ds0 channels, and means for routing information between said receiving means, said transmitting means, said interfacing means, and said processing means; and wherein said routing means routes packets having Ds0 channels at least in part based on the respective packet to said processing means after receiving the respective packet from at least one of said receiving means and said interfacing means.

In accordance with another aspect of the invention, a telecommunications network switching method comprising: receiving a signal at a communications node, separating the signal into packets, routing individual packets with Ds0 channels to a first Ds0 switch and switching the Ds0 channels into new packets headed to the same outgoing port of the communications node when the packet includes at least one Ds0 channel destined for another communications node, routing packets based on their destination to the appropriate transmission port, manipulating Ds0 channels of packets in a second Ds0 switch into at least one of larger packets, packets with more channels for fixed size packets, and packets destined for the same outgoing port at the next communications node, and transmitting the packets as a signal to the next communications node.

In accordance with another embodiment of the invention, a method for operating a port card comprising: receiving packets from a communications conduit, routing each packet based on destination of that packet such that when the packet includes at least two Ds0 channels destined for at least two different transmission ports, the packet is routed through a Ds0 switch, when the packet includes only data, the packet is routed to a data switch, and when all Ds0 channels in the packet are directed to the same downstream communications node, the packet is routed to a data switch, interfacing with a data switch, routing each packet received from the data switch to the Ds0 switch when the packet includes at least one of at least two Ds0 channels destined for different outgoing ports and the packet contains insufficient Ds0 channels, and transmitting the packet into a communications conduit.

In accordance with an alternative embodiment of the invention, testing features are significantly enhanced and allow every data path to be easily accessible for verification. The design allows for an easy to implement method of performing BER testing of the Ds0 switching matrix and other components on the port card. Testing can be conducted concurrently while carrying live traffic.

An objective of the invention is to provide for testing capabilities of the voice switching matrix while processing and transmitting real-time communications.

A further objective of the invention is to reduce the number of networks connected to customers and managed by communications service providers.

A further objective of the invention is to have each Ds0 channel pass through the data switching matrix only once.

An advantage of the invention in transmitting data over telecommunications links is that any type of service can be placed in the data packets including Ds0 channels.

Another advantage of the invention is a reduction and/or elimination in use of the data switching matrix resources and bandwidth by the Ds0 switching matrix while providing for a flexible and inexpensive Ds0 switching architecture.

Another advantage of the invention is that flexible, robust, and thorough built in self test features may be incorporated into the port card in an alternative embodiment.

A further advantage of the invention is that Ds0 channels are not duplicated and will not need to be rejected at those port cards that do not need them, because each port card re-arranges Ds0 channels such that the data packets presented to the data switching matrix will only go to a single destination.

A further advantage of the invention is that the communications service provider reduces the operational cost of managing communications networks and thus of providing communication services to customers.

Further features and advantages of the present invention, as well as the structure and operation of various embodiments of the present invention, are described in detail below with reference to the accompanying drawings.

III. BRIEF DESCRIPTION OF THE DRAWINGS

The present invention is described with reference to the accompanying drawings. In the drawings, like reference numbers indicate identical or functionally similar elements or steps.

IV. DETAILED DESCRIPTION OF THE INVENTION

Figure 1:
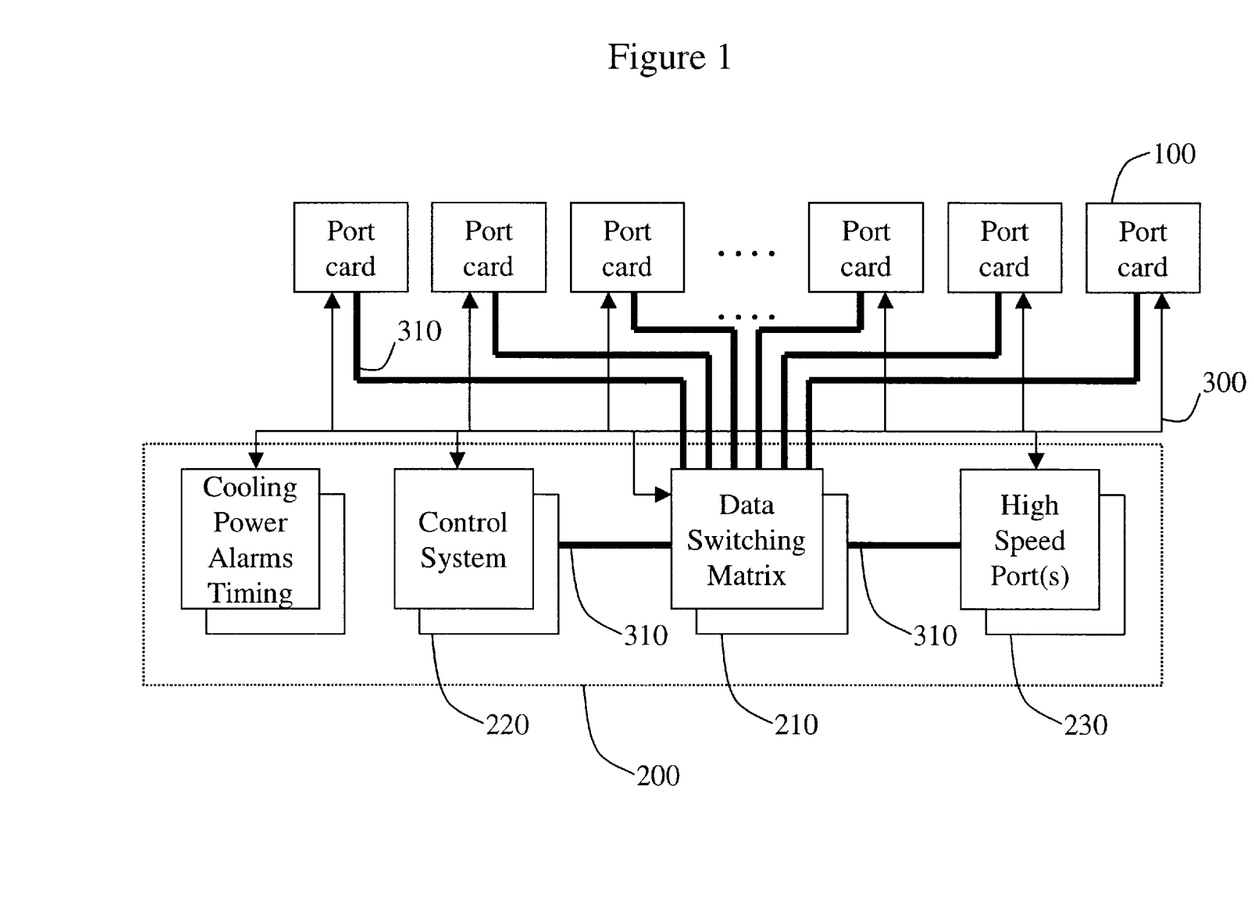
FIG. 1 illustrates an interface between port cards and a data switch.
Figure 2:
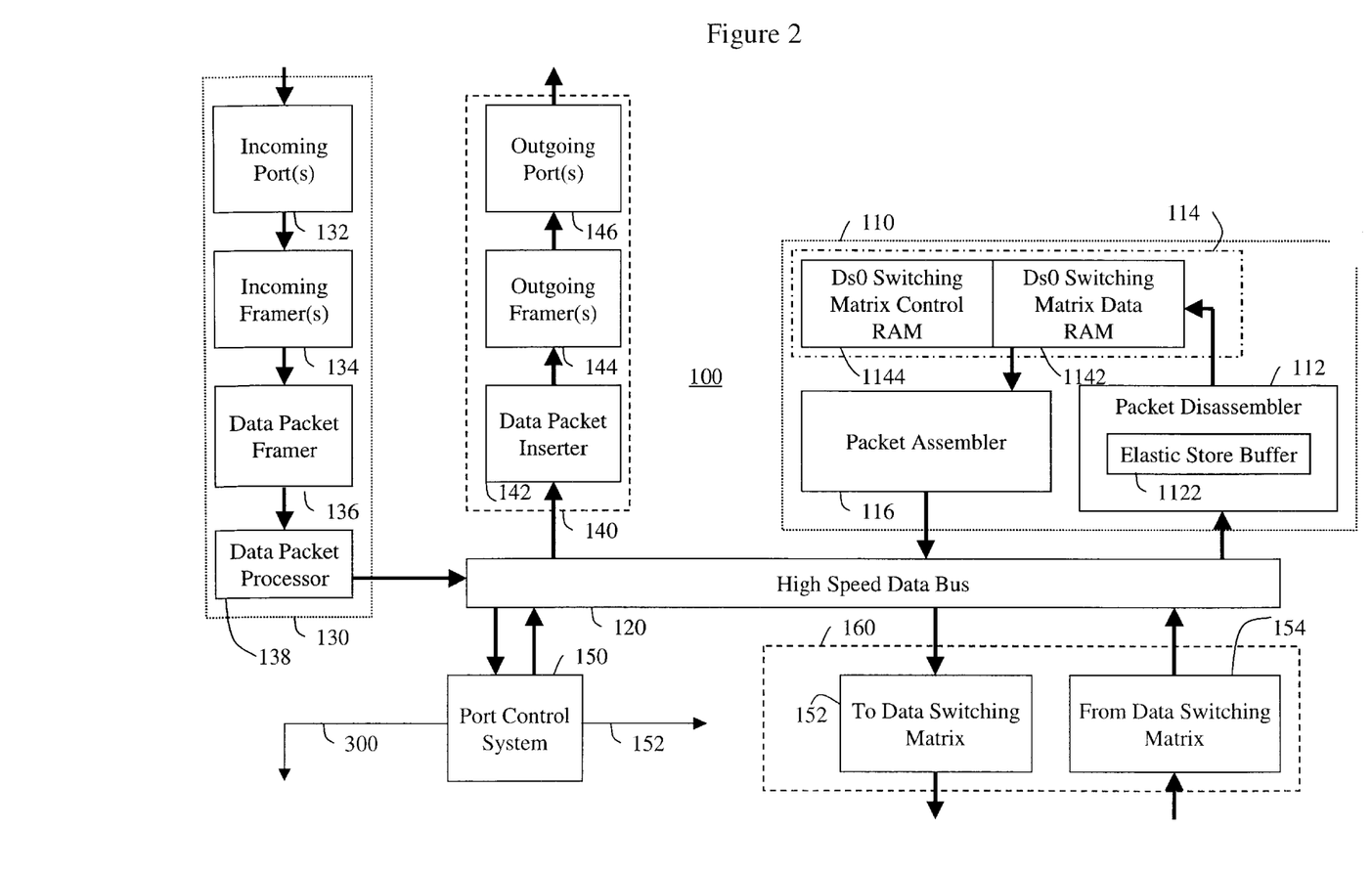
FIG. 2 depicts a block diagram of the invention.

FIGS. 1 and 2 together illustrate the preferred embodiment of the invention as an apparatus. The invention preferably is a port card 100 with a Ds0 switch (processing means) 110 and a high speed data bus (routing means) 120. The port card 100 also preferably includes at least one intake system (receiving means) 130, at least one outgoing system (transmitting means) 140, a port control system (controlling means) 150, and a data switch interface (interfacing means) 160. Each of these components on the port card 100 is linked together with the high speed data bus 120.

Preferably, the high speed data bus 120 will have a capacity greater than two times the port I/F capacity. For example, if a port card had an OC-12 interface on it, then the port I/F capacity will be 622 Mbps and the high speed data bus 120 will preferably have a capacity greater than 1244 Mbps. This is because the high speed data bus 120 would have to carry the incoming data from the intake system 130, plus the outgoing data to the outgoing system 140, plus additional capacity for overhead such as the Ds0 switch 110 and the port control system 150. The high speed data bus 120 routes data packets based on their headings around the port card 100 including to and from the data switch 200. The high speed data bus 120 allows data packets to be processed by the Ds0 switch 110 between receipt at the port card 100 and the data switch 200. The high speed data bus 120 also allows data packets to be processed by the Ds0 switch 110 between being sent to the port card 100 from the data switch 200 and its departure from the port card 100 out the outgoing system 140.

The intake system 130 preferably includes at least one incoming port (accepting means) 132 connected to a respective incoming framer (locating means) 134, which in turn is connected to a data packet framer (breaking means) 136 and a data packet processor (attaching means) 138. The data packet processor 138 is connected to the high speed data bus 120. The incoming port 132 receives the transmitted data packets as a signal from a link (or communications conduit) such as a T1 line, fiber optic line, V.35 or High Speed Serial Interface (HSSI), or similar as discussed above. The incoming framer 134 preferably detects and removes the link frame bits (or other representation to allowing the port card 100 to synchronize with the signal) between the data bits contained in the signal.

The data packet framer 136 preferably breaks apart the incoming data into the individual data packets. In some transmission schemes, data packet framing bits (not to be confused with the link frame bits removed by the incoming framer 134) may exist and thus preferably will be removed by the data packet framer 136. In the case when no data packet framing bits are used, the data packet framer 136 preferably will detect individual ATM cells based on the location of the header and the error check byte.

Preferably, the data packet processor 138 analyzes the packet header and attaches an internal addressing flag for use within the data switch 200 including the port card 100 that received the signal and the other port cards 100 attached to the data switch 100. The flag preferably includes destination and characteristic information unique to that particular data packet. The flag will dictate where the data packet goes within the data switch 200 and attached port cards 100, and thus the flag is modifiable during its travels within the data switch 200 and attached port cards 100.

The outgoing system 140 preferably includes a data packet inserter (flag removing or stripping means) 142, at least one outgoing framer 144, which in turn is connected to a respective outgoing port 146. The data packet inserter 142 removes the internal addressing flag and prepares the data packets for transmission. When the transmission scheme uses data packet framing bits, then the data packet inserter 142 preferably will insert the data packet framing bits. The outgoing framer 144 inserts the link frame bits into the outgoing data bits. The outgoing port 146 then transfers the data packets to another conduit, which preferably is the same conduit connected to the incoming port 132. Buffers may be connected and/or internal to the data packet inserter 142 and/or the outgoing framer 144 to handle the ebb and flow of data packets awaiting transmission. Additionally, the outgoing system may include the capability to insert null values if there are no data packets available for transmission.

A port card 100 may be connected to more than one link. Preferably, the port card 100 will have an incoming port 132, an incoming framer 134, an outgoing framer 144, and an outgoing port 146 for each link. In an alternative embodiment, if the port card 100 was connected to two links; then the port card 100 would include one incoming port, one incoming framer, one outgoing framer, and one outgoing port for one link and a second incoming port, a second incoming framer, a second outgoing framer, and a second outgoing port for the other link. Another alternative embodiment may contain a data packet inserter 142 for each outgoing port.

The port control system 150 while being connected to the high speed data bus 120 preferably is also connected to a control bus 300 connecting the port cards 100 to the data switch 200 as illustrated, for example, in FIGS. 1 and 2. The control bus 300 preferably is a low speed connection primarily for transmitting instructions upon start-up and emergency conditions where the connection to the high speed data bus 120 is not working. Preferably, the control bus 300 connects the port control system 150 to the control system 220 located in the data switch 200. There is an internal control bus 152 on the port card 100 that connects the port control system 150 to the other port card components. The existence of in-band communications to the port control system 150 does not preclude the existence of a small, separate control and communications link used for emergency and startup communications. Preferably, the port control system 150 is a controller processor.

The Ds0 switch 110 preferably includes a packet disassembler 112, a Ds0 switching matrix 114, and a packet assembler 116. The packet disassembler 112 preferably breaks apart a data packet having Ds0 channels into bytes to properly route the bytes to a specific location within the Ds0 switching matrix data RAM 1142 based on collation of timeslots of incoming and outgoing links. The packet disassembler 112 also removes the internal addressing flag from the data packet. Preferably, the packet disassembler 112 further includes an elastic store buffer 1122 to smooth and even out the arrival (or flow) of data packets entering the Ds0 switching matrix 114. The Ds0 switching matrix 114 preferably includes a Ds0 switching matrix data RAM 1142 and a Ds0 switching matrix control RAM 1144. The Ds0 switch matrix control RAM 1144 then selects different bytes stored in the Ds0 switching matrix data RAM 1142 to be sent to the packet assembler 116 preferably based on the destination of the respective bytes. The packet assembler 116 then gathers the grouped bytes into data packets and attaches a new internal addressing flag.

The Ds0 switch is capable of receiving both incoming data packets and outgoing data packets, depending on the respective flags attached to the data packets. The Ds0 switching matrix 114 can break out Ds0 channels destined for different outgoing ports into separate packets before sending the data packets to the data switch 200. Thus, each Ds0 carrying data packet, when received from the data switch 200 to the destination port card, will only have Ds0 channels that are destined to depart from the destination port card. This in turn reduces the bandwidth consumed on the data switch 200 and destination port card to reject data packets not departing from that destination port card. The Ds0 switching matrix 114 can groom Ds0 channels in data packets traveling through the port card 100 in both directions simultaneously.

The Ds0 switching matrix 114 can also accept Ds0 carrying packets from the data switching matrix 210. The Ds0 switching matrix 114 will remove Ds0 channels destined for different downstream nodes from various data packets and preferably combine all of those destined for one downstream node together in a single data packet depending upon data packet limitations. Data packets, which have Ds0 channels, received from the data switching matrix 210 can be combined into fewer, larger data packets to reduce the header processing load on downstream nodes, for port cards that handle variable sized data packets. If the port card uses fixed sized data packets, then the data packets can be combined into more channels per data packet to reduce the number of frames per data packet and thus latency, and also to reduce the amount of unused capacity in the payload of the packet.

The data switch interface 160 preferably includes a path 162 for sending received data packets to the data switch 200 and a path 164 for receiving data packets to be transmitted from the data switch 200. The data switch interface 160 may include buffers depending upon the exact implementation of the port card into a given data switch. The sending path 162 and the receiving path 164 preferably connect to the data switching matrix 210 located within the data switch 200 via a data path bus 310.

The bandwidth of the data packet bus 310 must exceed twice the bandwidth of the port signals. Under conditions of full traffic into and out of the card most of the data packet bus bandwidth will be used carrying this traffic. Sufficient bandwidth must remain for in-band communications between the port control system 150 and the control system 220 of the data switch 200. The control system 220 communicates with the port control system 150 using both in-band communication and out-of-band communication. When large control transfers occur, such as configuration setup and statistics download, they may be rapidly transferred to the port control system 150 via the data bus 310. Normal communications and control will be able to have a more rapid turnaround using the data bus 310 than what a slower, emergency backup channel would allow on the control bus 300. When required, emergency and startup communications can be accomplished using the out-of-band channel.

FIG. 1 illustrates a data switch 200 in which the port card 100 may be used in conjunction with to handle communication transmissions. The second shadow box represents the possibility that these components may have redundant copies. Redundancy does not have to be 1:1, that is, one active component and one fully capable standby component, but instead may be any ratio of N:M. The redundancy ratio variable N preferably is any integer number zero or greater and indicates the number of system components needed for full operation, and M preferably is any integer number zero or greater and indicates the number of spare system components that can substitute if one of the operating components fails. The components may have different amounts of redundancy, i.e., N and M may have different values for some components. Examples and illustrations of the N:M ratio are as follows. The high speed port 230 in some systems does not have a redundant high speed port 230, in which case the N:M ratio will be 1:0. Usually systems will include a single redundant processor card, in which case the N:M ratio will be 1:1. Some systems with multiple low capacity ports may have four operating ports and one standby capable of substituting for any of the operating ports, in which case the N:M ratio will be 4:1. The power supplies which provide controlled, filtered electrical power for switching systems may require three supplies to provide sufficient power and have two standby supplies, in which case the N:M ratio will be 3:2. Another example is when the data switch 200 sends all data packets to each of the port cards and requires the receiving port cards to filter out data packets not address to it, then there is no separate, physical data switching matrix 210, and in this scenario the N:M ratio will be 0:0.

In a properly designed network, the Ds0 switching matrix 114 on each port card 100 only has to breakdown or re-combine a fraction of the Ds0 channels entering or leaving the port card 100. By combining together Ds0 channels that are destined for the same outgoing port on the next (or next several) switch(es) those packets carrying these Ds0 channels do not have to be broken down and recombined on the next (several) switch(es).

The capacity of the switching matrix of a Ds0 channel on the port will vary depending on the capacity of the port interface(s). If the entire contents of a common industry signal, the OC-48 or STM-12, which runs at approximately 2.5 gbps, carries Ds0 traffic, it would carry 16K Ds0 channels with little room left for anything except overhead. This would still allow for a single data RAM to exist in this port card, making the design simple and efficient.

A properly designed network will organize, as soon as possible, data channels destined for a single end user as close to the source as it can. Thus, most Ds0 carrying data packets will not have any need to be switched by no more than a few Ds0 switching matrices. Thus, a 16K Ds0 switching matrix can actually support port interfaces of a much higher bandwidth, such as the OC-192 port, which runs at 10 gbps.

In an alternative embodiment, if there is insufficient capacity left in the Ds0 switching matrix on the port card to groom together Ds0 channels for a single outgoing port on a downstream switch, then the excess Ds0 carrying data packet(s) can bypass the Ds0 switching matrix. This Ds0 carrying data packet(s) will go straight out the port, and leave the job of grooming the Ds0 channels within it to the next, downstream switch.

Another alternative embodiment is to combine the data packet inserter 142 and the outgoing framer 144 into one component (means for preparing each packet for transmission). Preferably, the combined component will prepare the data packets for transmission as a signal.

Figure 3:
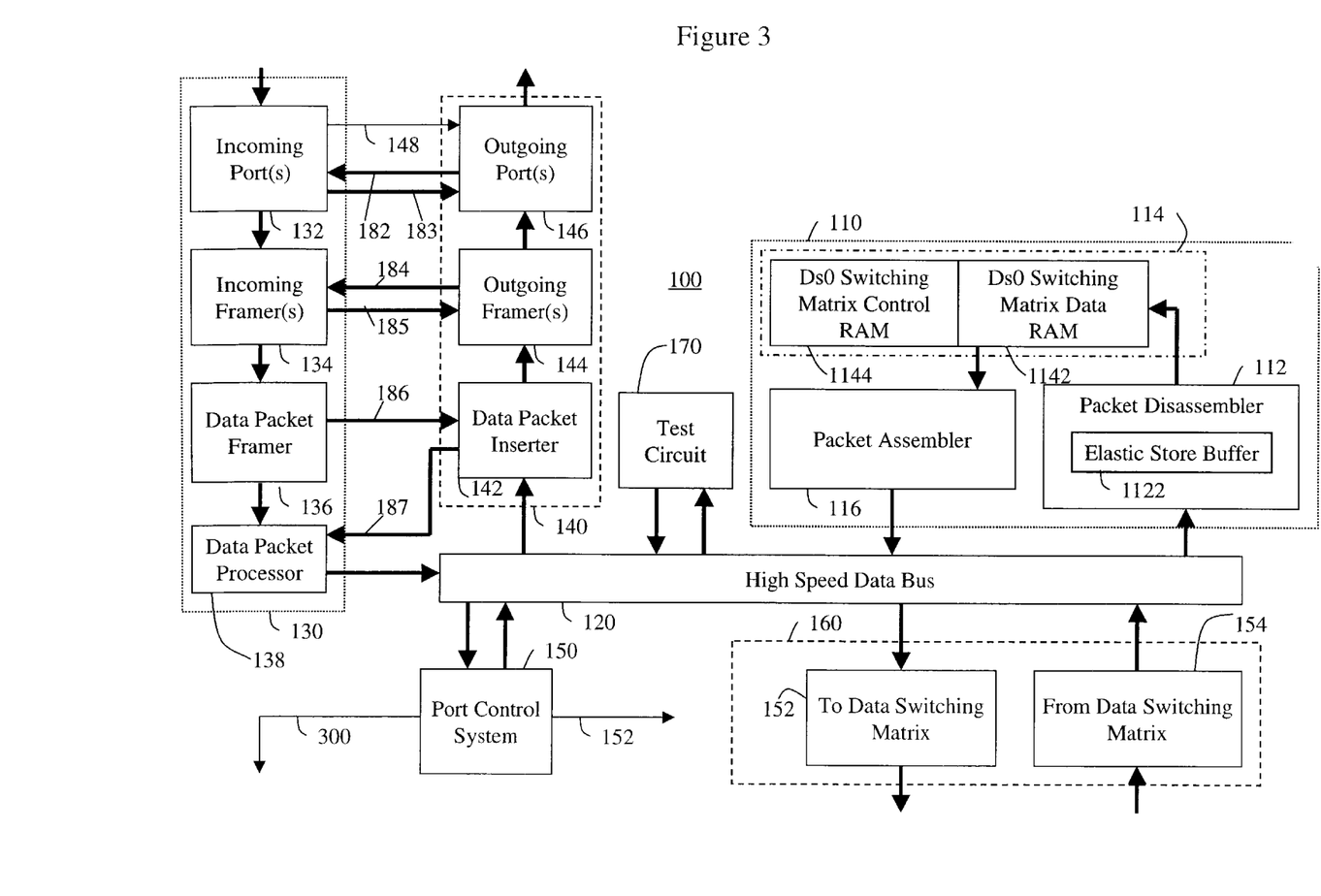
FIG. 3 illustrates block diagram of an alternative embodiment of the invention.

Another alternative embodiment adds a test circuit 170 to the port card 100 and is illustrated, for example, in FIG. 3. The test circuit 170 preferably if present is connected to the high speed data bus 120. The test circuit 170 is controlled by the port control system 150 via the control bus 152. The test circuit 170 may be programmed to generate and run test patterns through the port card 100 and even into the data switch 200 to ensure that the port card 100 is functioning properly. The testing preferably occurs during slow periods in data packet transmission and processing or when the card is running through self testing and diagnostics after being plugged in but prior to being allowed to carry customer traffic. Preferably, the test circuit 170 in conjunction with the port control system 150 will be programmable to run the test and verification patterns at predetermined times to perform regular maintenance, for example, the testing will occur at 1:00 a.m. each day. The test circuit 170 generates test data packets complete with a header and internal addressing flag. The test data packet will eventually return to the test circuit 170 so that it may verify both the path and that the switching functions are operating properly.

The output of the packet assembler 116 may be routed back to the input of the packet disassembler 112 to allow for repeated loops of traffic can be established that enable the test circuit 170 to test all storage locations within the Ds0 switching matrix RAM 1142 for extended lengths of time (BER). This is accomplished by having the internal addressing flag set in a test data packet such that it cycles through the Ds0 switch 110 through a series of channels to allow each location within the Ds0 switching matrix data RAM 1142 to be tested.

Preferably, the internal tests of this alternative embodiment may be run concurrently with live traffic.

Another alternative embodiment, also illustrated in FIG. 3, is to include loopback paths such as 182, 183, 184, 185, 186, 187 between the line interface components of the intake system and the outgoing system. The loopback paths 182, 184, 186 allow data packet loopback equivalents to occur through the passing of special test packets generated by the test circuit 170 and sent to the outgoing system components prior to looping over to a respective intake system component. The loopback paths 183, 185, 187 preferably are for network testing between nodes.

With the inclusion of the test circuit 170 and the loopback paths 182, 184, 186 on each port card 100, the ability of the port card 100 to deliver packets to any packet destination on the port card and allow for the testing of every data path on the port card 100 including paths to the data switch 200 is possible.

In addition, the loopback path 183 together with a recovered clock signal over line 148 will allow the physical signal coming into the port card to be duplicated and sent back out. Similarly, the payload content of an incoming signal may be extracted from the framing portion of the signal, then re-injected into an outgoing signal with new framing using loopback path 185. Similarly, the data packet content of an incoming signal may be extracted from the data bit portion of the signal, then re-injected into an outgoing signal using loopback path 187. Also, the loopback paths 183, 185 may be used to provide loopback tests where data packet organization is not realizable.

Furthermore, any path combination may be developed for the purpose of verifying all paths through the port card 100 and data switch 200 to verify the integrity of the data paths. The verification of the data paths will verify that that all communication and control paths are also working correctly. The means for testing and verifying may by any of the following individually or in combination: test circuit 170, loopback path 182, loopback path 184, and loopback path 186.

In another embodiment, a line (or connection) 148 connects the incoming port 132 to the outgoing port 146 for distributing a clock signal for use in transmitting signals. Preferably, the recovered clock signal on line 148 may be used to run loopback tests or may be used to clock the outgoing port 146 while carrying live traffic. Preferably, the outgoing port 146 may use the recovered clock signal from line 148 or another clock source to transmit the link signal out of the port card 100.

Figures 4, 5:
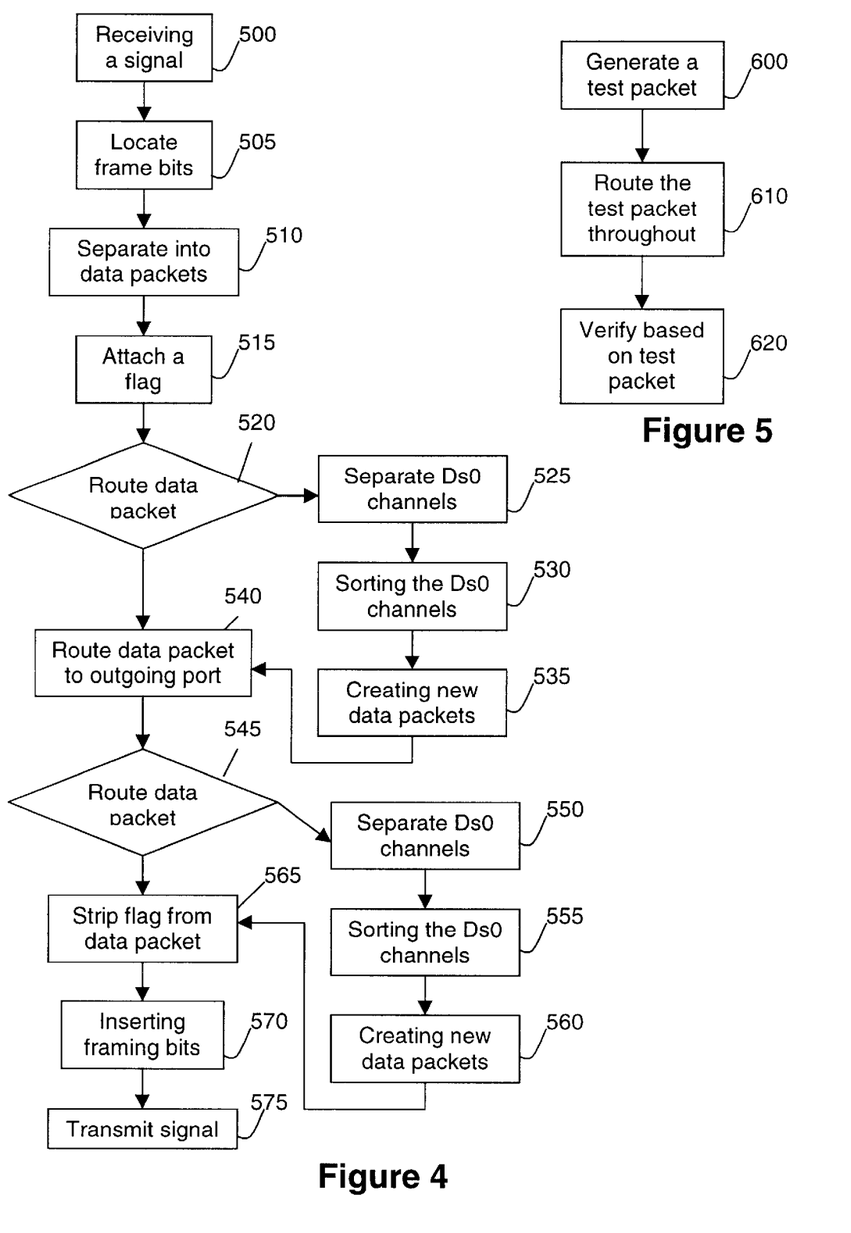
FIG. 4 depicts a flowchart of the preferred steps for performing the invention.
FIG. 5 illustrates a flowchart having steps for performing an alternative embodiment of the invention.

FIG. 4 illustrates a flowchart for performing the invention as a method. Preferably, the method is in its broadest since a telecommunications network switching method. The first step 500 is to receive a telecommunications signal at a node from another node, customer premise equipment, or a communications conduit.

The second step is to break or separate the signal into the data packets preferably based on the location of the frame bits, steps 505 and 510. Preferably when the signal is separated, step 510, into the different data packets, a flag is attached, step 515, to each data packet with the flag, in most cases, being unique for each data packet. The flag provides a representation or indication regarding the data packet destination and characteristic.

The flag preferably is used by the high speed data bus 120 to route the data packet as part of the third step 520. Preferably, the data packet is sent to a Ds0 switch when the data packet includes Ds0 channels that will need to be separated and sent to different outgoing ports from that node. Preferably, the Ds0 switch, as discussed above, repackages the Ds0 channels into new data packets and assigns new flags. Preferably, the repackaging includes separating the Ds0 channels from each other, step 525; sorting the Ds0 channels based on their destination nodes, step 530; and organizing them into new data packets, step 535. After leaving the Ds0 switch or if the data packet does not get routed there, the data packet is sent to the data switch for routing to the appropriate outgoing port, step 540.

Next, the data packet passes through another port card and may be diverted to a Ds0 switch on that port card, step 545. The diversion preferably will occur if 1) the data packet is small and for efficiencies purposes it will be combined with other similar destined data packets; 2) the data packet has excess room in the case of a fixed size data packet and more Ds0 channels may be added without increasing the data packet size; 3) Ds0 channels in the data packet are destined for the same outgoing port at the next node; and 4) there are more than one outgoing ports and the data packet includes Ds0 channels destined for different outgoing ports from that port card. Conditions 1 and 2 are examples of insufficient Ds0 channels.

The last step is for the data packet to be transmitted onto the next communications node. This step preferably includes removing the attached flag, step 565; inserting framing bit(s) based on the particular transmission protocol, step 570; transmitting the signal to the next communications node most likely through a communications conduit, step 575. Step 570 may include inserting data packet framing bit(s) depending upon the particular transmission protocol. Preferably, step 570 will include inserting physical link framing bits between data bits.

An additional step that may be added to the above-described method is interfacing with a data switch.

The method also allows for two types of control signals to be exchanged within the node. The first step is to transmit a first type or class of control signals such as configuration setup or statistical downloads through the data bus. The second step is to transmit a second type of control signals, signals not falling in the first type, through an out-of-band channel.

In an alternative method, the method also includes testing steps as shown in FIG. 5. The first testing step 600 preferably is to generate a test packet, but an alternative to this would be to have previously stored/created test packet resident on the port card to use for testing purposes. Next the test packets are routed throughout the port card and node to test the various pathways that data packets might travel within the node, step 610. Preferably, the results and changes made to the test packet will allow for verification of the data paths and operation of the port card and node, step 620. Preferably, the test packets may be sent to any data packet destination within either the port card or node, and preferably then return to the source of the data packet for verification. The source preferably is either a test circuit or the port control system.

A further alternative and adaptation of the method is to loop the test packets through the Ds0 switch to perform bit error rate testing.

In another alternative method, step 505 becomes removing the frame bits, while step 510 becomes separating the remaining bits into packets, for example, data packets. Step 505 may more preferably be removing link frame bits from the signal and depending on the transmission protocol, also, removing data packet framing bits.

There are five data packet sources and five data packet destinations on the port card 100 when the alternative embodiments are included within the invention. The sources are the incoming port signal(s) from the outside world, the output of the Ds0 switching matrix 114, the output of the data switching matrix to the port card 164, the output of the test circuit 170, and the output of the in-band interface to the port control system. The destinations are the outgoing port signal(s) to the outside world, the input to the Ds0 switching matrix 114, the input to the data switching matrix from the port card 162, the input to the test circuit 170, the input to the in-band interface to the port control system.

When the communications conduit is a V.35 or high speed serial interface, the clock and/or framing signals are preferably placed in parallel with one or more data signals for transmission between switches placed in very close proximity to each other.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

I claim:

1. A communications network comprising:
    at least two nodes connected to links, each of said nodes including:
        a data switch having a data switching matrix,
        a data bus connected to said data switch, and
        at least one port card connected to said data bus, said port card including:
            a high speed data bus,
            an input system connected to the high speed data bus and one of said links,
            an output system connected to the high speed data bus and one of said links, and
            a Ds0 switch connected to said high speed data bus, said Ds0 switch including a Ds0 switching matrix; and
    wherein said Ds0 switching matrix disassembles and reassembles packets after receipt of the packet by the port card from at least one of another data switch and said data switching matrix connected to said data bus,
    wherein said input system includes a packet processor connected to said high speed data bus, said packet processor assigning a modifiable flag to each received packet to route the received packet through said node, and said output system includes a packet inserter connected to said high speed data bus, said packet inserter removing the modifiable flag from each packet prior to the packet being sent to one of said links; and wherein said modifiable flag allows said high speed bus to route the packet to said Ds0 switch to move Ds0 channels within the packet through said communications network.

2. The communications network according to claim 1, wherein said port card further includes:
a data switch interface connected to said high speed data bus and said data bus.

3. A communications network comprising:
at least two nodes, each of said nodes connected to at least one link and each node including:
a data switch having a data switching matrix,
a data bus connected to said data switch, and
at least one port card connected to said data bus, said port card including:
a high speed data bus,
an input system connected to the high speed data bus and one of said links,
an output system connected to the high speed data bus and one of said links,
a Ds0 switch connected to said high speed data bus, said Ds0 switch including a Ds0 switching matrix, wherein said Ds0 switching matrix disassembles and reassembles packets after receipt of the packet by the port card from at least one of another data switch and said data switching matrix connected to said data bus, and
a test circuit connected to said high speed data bus and at least one loopback path connecting said output system with said input system such that said test circuit and said loopback path test and verify data paths on said port card.

4. The communications network according to claim 1, wherein said Ds0 switch further includes
a packet disassembler connected to said high speed data bus and said Ds0 switching matrix, and
a packet assembler connected to said high speed data bus and said Ds0 switching matrix.

5. The communications network according to claim 4, wherein said Ds0 switching matrix includes
a data RAM connected to said packet disassembler and said packet assembler, and
a control RAM connected to said data RAM.

6. The communications network according to claim 1, wherein
said data switch further includes a control system in communication with said data switching matrix, and
said port card further includes a port control system connected to said high speed data bus, and said port control system is in communication with said control system of said data switch.

7. A communications network node comprising:
a data switch, said data switch including a data switching matrix,
a data bus connected to said data switch, and
at least two port cards connected to said data bus, each of said at least two port cards including:
a high speed data bus,
a Ds0 switch connected to said high speed data bus, said Ds0 switch including a Ds0 switching matrix,
an intake system coupled to said high speed data bus, said intake system configured to receive a signal with packets from a source external to said communications network node and said intake system comprising:
a packet processor coupled to said high speed data bus, said packet processor configured to assign a modifiable flag to each received packet to route the received packet through said communications network node, said modifiable flag being used to route the packet to said Ds0 switch via the high speed data bus, and
an outgoing system coupled to said high speed data bus, said outgoing system configured to transmit a signal with packets to a source external to said communications network node, said outgoing system comprising:
a packet inserter connected to said high speed data bus, said packet inserter configured to remove the modifiable flag from each packet prior to the packet being transmitted out of said communications network node; and
wherein said Ds0 switching matrix disassembles and reassembles packets with Ds0 channels after receipt of the packet by the port card from at least one of a source other than said data switch and from said data switching matrix connected to said data bus.

8. The communications network node according to claim 7, wherein said port card further includes:
a data switch interface connected to said high speed data bus and said data bus.

9. A communications network node comprising:
a data switch, said data switch including a data switching matrix,
a data bus connected to said data switch, and
at least two port cards connected to said data bus, each of said at least two port cards including:
a high speed data bus,
a Ds0 switch connected to said high speed data bus, said Ds0 switch including a Ds0 switching matrix,
an intake system coupled to said high speed data bus, said intake system configured to receive a signal with packets from a source external to said communications network node,
an outgoing system coupled to said high speed data bus, said outgoing system configured to transmit a signal with packets to a source external to said communications network node, and
a test circuit connected to said high speed data bus and at least one loopback path connecting said outgoing system with said intake system such that said test circuit and said loopback path test and verify data paths on said port card; and
wherein said Ds0 switching matrix disassembles and reassembles packets with Ds0 channels after receipt of the packet by the port card from at least one of a source other than said data switch and from said data switching matrix connected to said data bus.

10. The communications network node according to claim 7, wherein said Ds0 switch further includes
a packet disassembler connected to said high speed data bus and said Ds0 switching matrix, and
a packet assembler connected to said high speed data bus and said Ds0 switching matrix.

11. The communications network node according to claim 10, wherein said Ds0 switching matrix includes
a data RAM connected to said packet disassembler and said packet assembler, and
a control RAM connected to said data RAM.

12. The communications network node according to claim 7, wherein
said data switch further includes a control system in communication with said data switching matrix, and
said port card further includes a port control system connected to said high speed data bus, and said port control system is in communication with said control system of said data switch.

13. A port card comprising:
a high speed data bus,
an intake system connected to said high speed data bus,
an outgoing system connected to said high speed data bus,
a port control system connected to said high speed data bus,
a switch interface connected to said high speed data bus,
a Ds0 switch connected to said high speed data bus, wherein said Ds0 switch disassembles and reassembles packets after initial receipt of the packet by at least one of said intake system and said switch interface based on the packet,
a control bus connected to at least one of said intake system, said outgoing system, said switch interface, and said Ds0 switch,
a test circuit connected to said high speed data bus and said control bus, and
at least one loopback path connecting said outgoing system with said intake system, said test circuit and said loopback path being configured to test and verify data paths on said port card.

14. The port card according to claim 13, wherein the control bus is connected to each of said intake system, said outgoing system, said switch interface, and said Ds0 switch.

15. A port card comprising:
a high speed data bus,
a port control system coupled to said high speed data bus,
a switch interface coupled to said high speed data bus,
a Ds0 switch coupled to said high speed data bus,
an intake system coupled to said high speed data bus, said intake system comprising:
a packet processor connected to said high speed data bus, said packet processor configured to assign a modifiable flag to each received packet to route the received packet through said port card, and
an outgoing system coupled to said high speed data bus, said outgoing system comprising:
a packet inserter connected to said high speed data bus, said packet inserter configured to remove the modifiable flag from each packet prior to the packet being transmitted by said port card, wherein said modifiable flag is used to route the packet to said Ds0 switch and move Ds0 channels as part of packets through a communications network, and
wherein said Ds0 switch disassembles and reassembles packets after initial receipt of the packet by at least one of said intake system and said switch interface based on the packet.

16. A port card comprising:
a high speed data bus,
an intake system connected to said high speed data bus,
an outgoing system connected to said high speed data bus,
a port control system connected to said high speed data bus,
a switch interface connected to said high speed data bus, and
a Ds0 switch connected to said high speed data bus and configured to disassemble and reassemble packets after initial receipt of the packet by at least one of said intake system and said switch interface based on the packet, the Ds0 switch comprising:
a Ds0 switching matrix,
a packet disassembler connected to said high speed data bus and said Ds0 switching matrix, and
a packet assembler connected to said high speed data bus and said Ds0 switching matrix; and
wherein said Ds0 switching matrix organizes Ds0 channels based at least in part on the destination of each Ds0 channel.

17. The port card according to claim 16, wherein said Ds0 switching matrix includes
a data RAM connected to said packet disassembler and said packet assembler, and
a control RAM connected to said data RAM.

18. A port card comprising:
means for receiving packets as at least one of a asynchronous transmission and a synchronous transmission, the means for receiving comprising:
means for accepting at least one signal having packets,
means for removing frame bits within the signal,
means for separating the remaining data bits left within the signal into individual packets, and
means for attaching a flag to each packet, wherein the flag is representative of internal addressing information and is modifiable,
means for transmitting packets as at least one of a asynchronous transmission and a synchronous transmission, the means for transmitting comprising:
means for removing the flag attached to each packet, and
means for preparing each packet for transmission,
means for interfacing with a data switch,
means for processing packets having Ds0 channels, and
means for routing information between said receiving means, said transmitting means, said interfacing means, and said processing means; and
wherein said routing means routes packets having Ds0 channels at least in part based on the respective packet to said processing means after receiving the respective packet from at least one of said receiving means and said interfacing means.

19. The port card according to claim 18, wherein said processing means includes
means for disassembling packets having Ds0 channels into bytes,
means for switching bytes around to form new packets, and
means for assembling the switched around bytes into new packets.

20. The port card according to claim 18, wherein the flag is modifiable by said processing means.

21. A port card comprising:
means for receiving packets as at least one of a asynchronous transmission and a synchronous transmission,
means for transmitting packets as at least one of a asynchronous transmission and a synchronous transmission,
means for interfacing with a data switch, means for processing packets having Ds0 channels, means for routing information between said receiving means, said transmitting means, said interfacing means, and said processing means, wherein said routing means routes packets having Ds0 channels at least in part based on the respective packet to said processing means after receiving the respective packet from at least one of said receiving means and said interfacing means, means for controlling the operation of said port card, and means for testing and verifying the data paths and functionality of said port card.

22. The port card according to claim 18, wherein said routing means is a high speed data bus.

23. The port card according to claim 18, wherein said processing means is a Ds0 switch.

24. The port card according to claim 18, wherein said receiving means and said transmitting means communicate using the same transfer mode type.

25. A telecommunications network switching method comprising:

receiving a signal at a communications node, separating the signal into packets, routing individual packets with Ds0 channels to a first Ds0 switch and switching the Ds0 channels into new packets headed to the same outgoing port of the communications node when the packet includes at least one Ds0 channel destined for another communications node, routing packets based on their destination to the appropriate transmission port, manipulating Ds0 channels of packets in a second Ds0 switch into at least one of larger packets, packets with more channels for fixed size packets, and packets destined for the same outgoing port at the next communications node, and transmitting the packets as a signal to the next communications node.

26. The method according to claim 25, wherein the first Ds0 switch is on a first port card and the second Ds0 switch is on at least one of a second port card and the first port card.

27. The method according to claim 25, further comprising:

generating test packets in a test circuit, routing the test packets through at least a portion of the communications node, and verifying the path followed by the test packet and the switching functions are operating properly after the test packet returns to the test circuit.

28. The method according to claim 27, wherein routing the test packets includes sending the test packets to any packet destination in the communications node, and returning the test packets from any packet destination in the communications node to the test circuit.

29. The method according to claim 27, wherein routing the test packets includes sending the test packets to the Ds0 switch, looping the test packets repeatedly through the Ds0 switch to perform bit error rate testing, and returning the test packets to the test circuit.

30. The method according to claim 25, further comprising:

transmitting a first type of control signals internal to the communications node through a data bus, and transmitting a second type of control signals internal to the communications nodes through an out-of-band channel; and wherein the first type of control signals includes signals distinct from signals included within the second type of control signals.

31. The method according to claim 30, wherein the first type of control signals includes configuration setup and statistical downloads.

32. The method according to claim 25, wherein said separating the signal into packets includes removing the frame bits in the signal, separating the remaining bits into packets, and attaching a flag to each of the packets based on the respective packet.

33. The method according to claim 32, wherein the flag for internal addressing of the packet within the communications node and as such is modifiable within the communications node.

34. The method according to claim 32, wherein routing individual packets to a first Ds0 switch includes determining based on the flag whether Ds0 channels are included within the packet.

35. The method according to claim 32, wherein switching the Ds0 channels and manipulating Ds0 channels include separating the Ds0 channels within each packet, sorting the Ds0 channels based on the destination downstream communications node to which the Ds0 channel is addressed for, organizing the sorted Ds0 channels into new packets, and attaching a new flag to each new packet.

36. The method according to claim 32, wherein said transmitting includes removing the attached flag from each packet, creating the signal, and sending the signal to the next communications node.

37. A method for operating a port card comprising:

receiving packets from a communications conduit, routing each packet based on destination of that packet such that when the packet includes at least two Ds0 channels destined for at least two different transmission ports, the packet is routed through a Ds0 switch, when the packet includes only data, the packet is routed to a data switch, and when all Ds0 channels in the packet are directed to the same downstream communications node, the packet is routed to a data switch, interfacing with a data switch, routing each packet received from the data switch to the Ds0 switch when the packet includes at least one of at least two Ds0 channels destined for different outgoing ports and the packet contains insufficient Ds0 channels, and transmitting the packet into a communications conduit.

38. The method according to claim 37, wherein when a packet is routed through a Ds0 switch, said method includes separating the Ds0 channels in the packet, sorting the Ds0 channels based on the destination downstream communications node to which the Ds0 channel is addressed for, organizing the sorted Ds0 channels into new packets.

39. The method according to claim 37, further comprising:
   attaching a flag to each packet after receiving the packet,
   striping the flag from each packet prior to transmitting the packet, and
   wherein the flag represents internal addressing information regarding the respective packet and as such is modifiable as packets undergo modification and creation.

40. The method according to claim 37, further comprising testing the operation of the port card.

41. The method according to claim 40, wherein testing includes
   generating a test packet,
   routing the test packet through the port card,
   verifying the path of the test packet and the operation of the port card based on the routed test packet.

42. The method according to claim 41, wherein routing the test packet includes looping the test packet through the Ds0 switch to perform bit error rate testing.

43. The method according to claim 37, further comprising determining whether insufficient Ds0 channels are in a packet based on whether additional Ds0 channels may be placed within the packet.

44. The method according to claim 37, further comprising determining whether insufficient Ds0 channels are in a packet based on the size of the packet in relation to the size of other packets such that when the packet is smaller than other packets, the packet will be combined with other packets.

* * * * *